United States Patent
Subramanian

(12) 
(10) Patent No.: US 6,258,467 B1
(45) Date of Patent: Jul. 10, 2001

(54) THERMAL BARRIER COATING HAVING HIGH PHASE STABILITY

(75) Inventor: Ramesh Subramanian, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/640,575

(22) Filed: Aug. 17, 2000

(51) Int. Cl.$^7$ .............. B32B 9/00; B32B 15/00; C23C 4/10
(52) U.S. Cl. .......... 428/633; 428/678; 428/680; 428/469; 428/472; 416/241 R; 416/241 B; 427/453; 427/454; 427/585; 427/567
(58) Field of Search ................ 428/632, 633, 428/668, 678, 680, 469, 472; 416/214 R, 241 B; 427/453, 454, 567, 585, 587, 248.1

(56) References Cited

U.S. PATENT DOCUMENTS

| 4,321,310 | 3/1982 | Ulion et al. . |
|---|---|---|
| 5,304,519 | 4/1994 | Jackson et al. . |
| 5,562,998 | 10/1996 | Strangman . |
| 5,683,825 | 11/1997 | Buce et al. . |
| 5,789,330 | 8/1998 | Kondo et al. . |
| 6,127,048 | * 10/2000 | Beele ................................ 428/623 |
| 6,177,200 | * 1/2001 | Maloney ............................ 428/472 |

OTHER PUBLICATIONS

Sintering Sm2O3–ZrO2 Solid Solution [Sm203–ZrO2 kei koyoutai no shouketsu] by Kazuo Shinizaki, Hongrong Sun **, Keizo Uematsu, Nobuyasu Mizutani, and Masanori Kato* The Chemical Society of Japan, 1981, (9), p. 1454–1461.

La2Zr2O7—a new candidate for thermal barrier coatings, R. VaBen, X. Cao, F. Tietz, G. Kerkoff and D. Stover, Julich/D. United Thermal Spray Conference, 17.–19.3.99, Düsseldorf, Hrsg. E. Lugscheider, P.A. Kammer, Verlag Für Schweiben und Verwandte Verfahren, Düsseldorf, 1999, p. 830–834.

* cited by examiner

Primary Examiner—Deborah Jones
Assistant Examiner—Bryant Young

(57) ABSTRACT

A device (10) comprising a substrate (22) having a deposited ceramic thermal barrier coating layer (20) characterized by a microstructure having gaps (28) where the thermal barrier coating (20) consists essentially of a pyrochlore crystal structure having a chemical formula consisting essentially of $A^{n+}_{2-x}B^{m+}_{2+x}O_{7-y}$, where A is selected from the group of elements selected from La, Ce, Pr, Nd, Sm, Eu, Gd, Tb, Dy, Ho, Er, Tm, Yb, and mixtures thereof; where B is selected from the group of elements selected from Zr, Hf, Ti and mixtures thereof; n and m are the valence of A and B respectively, and for $-0.5 \leq x \leq 0.5$, $$y = 7 - \frac{((2-x)n + (2+x)m)}{2},$$

and excluding the following combinations for x=0, y=0: A=La and B=Zr; A=La and B=Hf; A=Gd and B=Hf; and A=Yb and B=Ti.

18 Claims, 3 Drawing Sheets

THERMAL BARRIER COATING HAVING HIGH PHASE STABILITY

This invention was made with United States Government support under contract number DE-AC05-95OR22242 awarded by the Department of Energy. The Government has certain rights in this invention.

FIELD OF THE INVENTION

This invention relates generally to the field of thermal barrier coatings, and more particularly to a thermal barrier coating for very high temperature applications, such as in a combustion turbine engine. In particular, this invention relates to the field of ceramic thermal barrier coatings having high phase stability at 1400° C. and higher, which are resistant to sintering damage, for coating superalloy or ceramic components in the hot sections of a combustion turbine, such as turbine blades and vanes, transitions, ring segments and combustors.

BACKGROUND OF THE INVENTION

The demand for continued improvement in the efficiency of combustion turbine and combined cycle power plants has driven the designers of these systems to specify increasingly higher turbine inlet temperatures. Although nickel and cobalt based superalloy materials are now used for components in the hot gas flow path, such as combustor transition pieces and turbine rotating and stationary blades, even these superalloy materials are not capable of surviving long term operation at temperatures sometimes as high as 1400° C.

It is known in the art to coat a superalloy metal component with an insulating ceramic material to improve its ability to survive high operating temperatures, for example U.S. Pat. No. 4,321,310 (Ulion et al). It is also known to coat the insulating ceramic material with an erosion resistant material to reduce its susceptibility to wear caused by the impact of particles carried within the hot gas flow path; for example, U.S. Pat. Nos. 5,683,825 and 5,562,998 (Bruce, et al. and Strangman, respectively).

Much of the development in this field of technology has been driven by the aircraft engine industry, where turbine engines are required to operate at high temperatures, and are also subjected to frequent temperature transients as the power level of the engine is varied. A combustion turbine engine installed in a land-based power generating plant is also subjected to high operating temperatures and temperature transients, but it may also be required to operate at full power and at its highest temperatures for very long periods of time, such as for days or even weeks at a time. Prior art insulating systems are susceptible to degradation under such conditions at the elevated temperatures demanded in the most modern combustion turbine systems.

U.S. Ser. No. 09/245262, filed on Feb. 2, 1999 (Subramanian, et al.; ESCM 283139-00491), also related to columnar thermal barrier coatings (TBCs), usually of yttria-stabilized zirconia (YSZ), deposited by electron beam physical vapor deposition (EB-PVD) with a sintering resistant layer of aluminum oxide or yttrium aluminum oxide, deposited as a continuous or discontinuous layer between submicron gaps in the TBC columns. This material was thermally stable up to about 1200° C. Other columnar TBC coatings are described in U.S. Ser. No. 09/393,415, filed on Sep. 10, 1999, (Subramanian; ESCM 283139-00224), where TBC columns had a composition of $(A,B)_xO_y$ and were covered by a sheath of a composition of $C_zO_w$, where A,B and C were selected from Al, Ca, Mg, Zr, Y, Sc and rare earth equal to La, Ce, Pr, Nd, Pm, Sm, Eu, Gd, Tb, Dy, Ho, Er, Tm, and Yb. In this application, a reaction between $C_zO_w$ and $(A,B)_xO_y$ was key to obtain a multiphase TBC system which was expected to be sinter resistant and strain tolerant up to 1400° and higher. The same materials were used as an $(A,B)_xO_y$ planar based TBC coated with a $C_zO_w$ overlay in U.S. Ser. No. 09/393,417, filed on Sep. 10, 1999, (Subramanian; ESCM 283139-00223). In this application also, a reaction between $C_zO_w$ and $(A,B)_xO_y$ was key to obtain a multiphase TBC system which was expected to be sinter resistant and strain tolerant up to 1400° and higher. Specific compounds capable for application as TBCs are described in U.S. Ser. No. 09/405,498, filed on Sep. 24, 1999 (Subramanian, et al.; ESCM 283139-00076). There, TBC layers of $LaAlO_3$, $NdAlO_3$, $La_2Hf_2O_7$, $Dy_3Al_5O_{12}$, $Ho_3Al_5O_{12}$, $ErAlO_3$, $GdAlO_3$, $Yb_2Ti_2O_7$, $LaYbO_3$, $Gd_2Hf_2O_7$, and $Y_3Al5O_{12}$ were generally described. These were compounds capable for TBC application, due to their inherently superior sintering resistance and phase stability.

A solid, vapor deposition material useful for the EB-PVD method to provide heat resistant coatings in aircraft engines and the like, where excellent heat resistance and thermal shock resistance is required, is taught by U.S. Pat. No. 5,789,330 (Kondo, et al). There, the material is sintered zirconia, containing a special stabilizer selected from yttria, magnesium oxide, calcium oxide, scandium oxide, or oxides of rare earth elements equal to La, Ce, Pr, Nd, Pm, Sm, Eu, Hd, Tb, Dy, fermium, Wr, thulium, Yb and ruthenium in the range of 0.1 wt percent to 40 wt percent of the material. The sintered material has 25% to 70% monoclinic phase and up to 3% tetragonal phase, with the rest as cubic phase.

Some high temperature resistant coatings, as taught in U.S. Pat. No. 5,304,519 (Jackson, et al), have utilized thermal spraying of zircon plus zirconia particles ($ZrSiO_4$ and $ZrO_2$ respectively) partially stabilized with an oxide selected from CaO, $Y_2O_3$, MgO, $CeO_2$, $HfO_2$ or rare earth oxide, where rare earth equal La, Ce, Pr, Nd, Pm, Sm, Eu, Gd, Tb, Dy, Ho, Er, Tm, Yb, and Lu. These materials are used as refractory, thermal shock resistant coatings for hearth rolls for annealing steel, stainless steel and silicon steel sheet at furnace temperatures between 820° C. and 1100° C.

Data regarding sintering rates of single oxides $A_xO_y$ are available but only a few publications discuss sintering rates of multicomponent oxides. One such publication is by Shinozaki, et al. 1981, (9), pp. 1454–1461, where the sintering tendencies of a solid solution of mixed $Sm_2O_3$—$ZrO_2$ were discussed in The Chemical Society of Japan, "Sintering $Sm_2O_3$—$ZrO_2$ Solid Solution." There, tablets of the mixed component oxides at various mole % were sintered at from 1200° C. to 1600° C. and isothermal linear shrinkage was measured. The least amount of sintering, 3% to 10% at 1400° C., was found at ranges of 5 mole % to 50 mole % $Sm_2O_3$.

In "$La_2Zr_2O_7$—a new candidate for thermal barrier coatings", R. Vaβen, X. Cao, F. Tietz, G. Kerkhoff, D. St över, United Thermal Spray Conference, 17.–19.3.99, D üsseldorf, Hrsg. E. Lugscheider, P. A. Kammer, Verlag Für Schweiβen und Verwandte Verfahren, Düsseldorf, 1999, p. 830–034, plasma sprayed TBC coatings of one specific compound, $La_2Zr_2O7$, were discussed. Although this material is of the pyrochlore structure, as shown in their FIG. 2, our own results in the Example, below, show this specific compound is not good as a TBC. However, introduction of cation excess/defects or oxygen defects change the sintering properties and this is not suggested in the paper.

What is needed is a TBC coating for a device, where the coating will remain thermally stable, protective, strain compliant, and resistant to substantial sintering of gaps in its grain structure, for use in long-term, high temperature turbine applications at temperatures up to 1400° C. Preferably the TBC will be a new material which itself meets the above criteria without the need for extra processing steps or additional coating.

It is a main object of this invention to provide a device which is capable of operating at temperatures up to about 1400° C. for extended periods of time with reduced component degradation. It is a further object of this invention to provide a method of producing such a device that utilizes commercially available materials processing steps.

SUMMARY OF THE INVENTION

These and other objects of the invention are accomplished by providing a device for operating over a range of temperatures, having a deposited thermal barrier coating on at least a portion of its surface, the device comprising a substrate with a bond coat; and then a deposited ceramic thermal barrier layer, the ceramic layer consisting essentially of a pyrochlore crystal structure having a chemical formula consisting essentially of $A^{n+}_{2-x}B^{m+}_{2+x}O_{7-y}$ where A is selected from the group of elements consisting of La, Ce, Pr, Nd, Sm, Eu, Gd, Tb, Dy, Ho, Er, Tm, Yb, and mixtures thereof; where B is selected from the group of elements consisting of Zr, Hf, Ti, and mixtures thereof; n and m are the valence of A and B respectively; and for $-0.5 \geq x \geq 0.5$, $y=7-([(2-x)n+(2+x)m]/2)$ or $y=7-(((2-x)n+(2+x)m)/2)$, that is:

$$y = 7 - \frac{[(2-x)n + (2+x)m]}{2},$$

and excluding the following combinations for x=0, y=0: A=La and B=Zr; A=La and B=Hf; A=Gd and B=Hf; and A=Yb and B=Ti, which describe the following excluded compounds: $La_2Zr_2O_7$, $La_2Hf_2O_7$, $Gd_2Hf_2O_7$, and $Yb_2Ti_2O_7$. The preferred combinations for this invention are A=Sm and B=Zr; A=Eu and B=Zr; A=Gd and B=Zr; with the first combination being the most preferred.

Further, a method according to this invention, for producing a device operable over a range of temperatures, includes the steps of: providing a substrate; depositing a bond coat and then depositing a ceramic thermal barrier layer over the bond coat in a manner that provides a deposited ceramic layer consisting essentially of a pyrochlore crystal structure having a chemical formula consisting essentially of $A^{n+}_{2-x}B^{m+}_{2+x}O_{7-y}$, where A is selected from the group of elements consisting of La, Ce, Pr, Nd, Sm, Eu, Gd, Tb, Dy, Ho, Er, Tm, Yb, and mixtures thereof; where B is selected from the group of elements consisting of Zr, Hf, Ti and mixtures thereof; n and m are the valence of A and B respectively; and for $-0.5 \geq x \geq 0.5$, $$y = 7 - \frac{[(2-x)n + (2+x)m]}{2},$$

and excluding the following combinations for x=0, y=0: A=La and B=Zr; A=La and B=Hf; A=Gd and B=Hf; and A=Yb and B=Ti.

These compositions will be extremely stable even under long term exposure to temperatures up to about 1500° C. and can be deposited by well known plasma spray, EB-PVD, and D-gun techniques, HVOF (high velocity oxygen fuel deposition) techniques, inductively coupled deposition processes, and electron beam directed vapor deposition techniques.

BRIEF DESCRIPTION OF THE DRAWINGS

These and other advantages of the invention will be more apparent from the following description in view of the drawings which show.

DETAILED DESCRIPTION OF THE PREFERRED EMBODIMENTS

Figure 1:
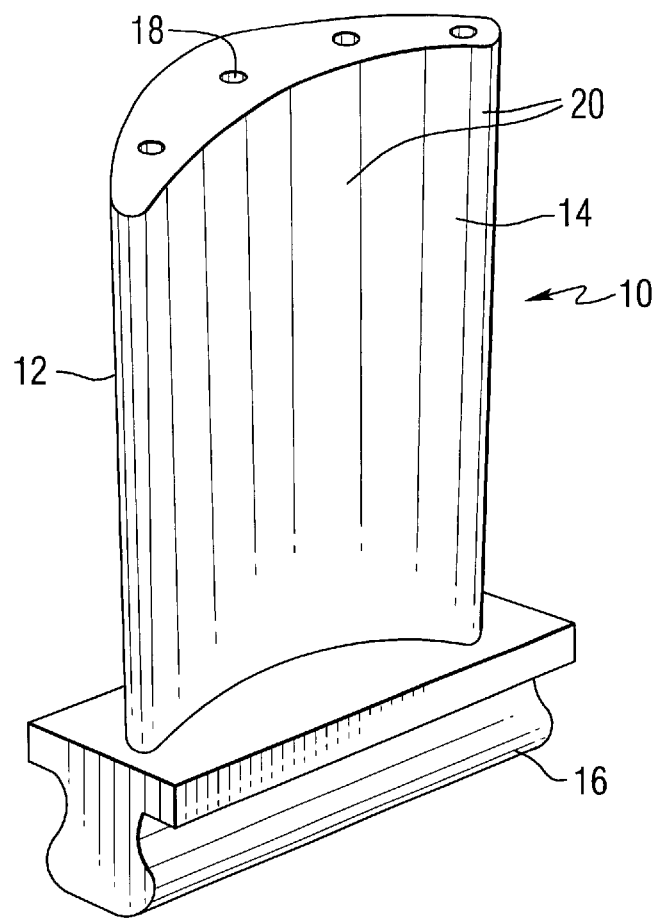
FIG. 1 is a perspective view of a device, such as a turbine blade coated with a bond coat layer and then a ceramic thermal barrier layer in order to better resist heat, oxidation, and erosion in a thermally stressed operating environment.

Referring now to FIG. 1, one component device of a turbine is shown. Turbine blade 10 has a leading edge 12 and an airfoil section 14, against which hot combustion gases are directed during operation of the turbine, and which is subject to severe thermal stresses, oxidation and corrosion. The root end 16 of the blade anchors the blade. Cooling passages 18 may be present through the blade to allow cooling air to transfer heat from the blade. The blade itself can be made from a high temperature resistant nickel or cobalt based superalloy, such as, a combination of Ni·Cr·Al·Co·Ta·Mo·W.

A basecoat (or bond coat) could cover the body of the turbine blade, which basecoat (or bond coat) could be covered by a thermal barrier coating 20. The barrier layer of this invention, as well as the base coat (or bond coat) and other protective coating can be used on a wide variety of other components of turbines, such as, turbine vanes, turbine transitions, or the like, which may be large and of complex geometry, or upon any substrate made of, for example, metal or ceramic, where thermal protection is required.

Figure 2:
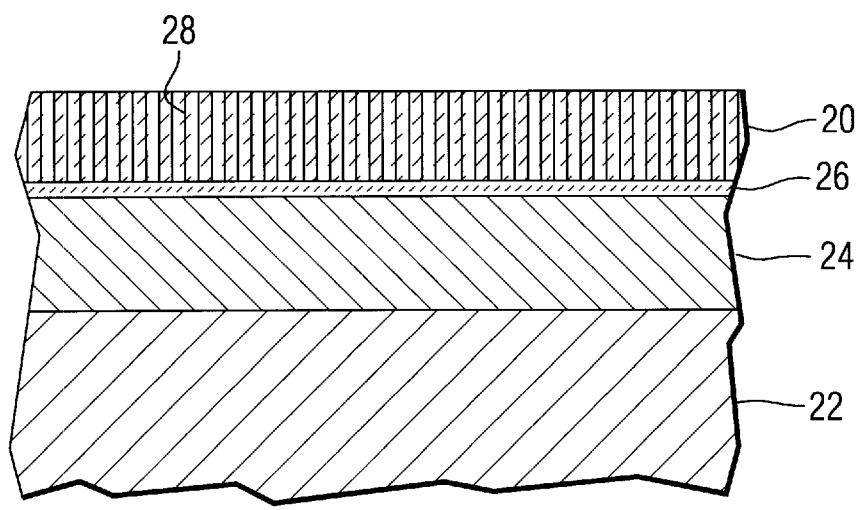
FIG. 2, which best shows the invention, is an idealized fragmented sectional view through a device, such as a turbine component, for example, a turbine blade showing the top thermal barrier layer of this invention with other optional protective layers between it and the bottom substrate.

FIG. 2 shows one example of possible thermal barrier coating system for the protection of a turbine component substrate 22 such as the superalloy core of a turbine blade. A basecoat 24 of a MCrAlY-type alloy can be used as a protection layer, as shown, where M (metal) in the alloy is usually selected from the group consisting of Ni, Co, Fe and their mixtures and Y is here defined as included yttrium, Y, as well as La, and Hf. This layer can be deposited by sputtering, electron beam vapor deposition or one of a number of thermal spray processes including low pressure plasma spraying, high velocity oxygen fuel (HVOF), and the like to provide a relatively uniform layer about 0.0025 cm to 0.050 cm (0.001 inch to 0.020 inch) thick. One purpose of this layer is to provide, upon heat treatment, an oxide scale 26, predominately aluminum oxide, about 0.3 micrometers to 5 micrometers thick, in order to further protect the substrate 22 from oxidative attack.

When prior art thermal barrier coating systems are exposed to the high temperature environment of the hot gas flow path of a land-based combustion turbine power plant, one of the reasons for failure of the thermal barrier coating (TBC) is sintering and loss in strain tolerance of the TBC. A current state-of-the-art TBC 20 is yttria-stabilized zirconia (YSZ) deposited by electron beam physical vapor deposition (EB-PVD). The EB-PVD process provides the YSZ coating with a columnar microstructure having sub-micron sized gaps 28 between adjacent columns of YSZ normal (90°) angle to the substrate material. Alternatively, the YSZ may be applied by air plasma spraying (APS), which consists of a series of sub-micron sized cracks, also here considered gaps, within the YSZ layer and predominantly parallel to the substrate. The gaps provide a mechanical flexibility to the TBC layer. During operation at high temperatures, these gaps have a tendency to close, and if the device is maintained at the elevated temperature, usually above 1200° for 8YSZ, for a sufficient length of time, the adjacent sides of the gaps will bond together by sintering. The bonding of the ceramic material across the gaps reduces the strain compliance of the TBC coating, thereby contributing to the potential for failure of the TBC during subsequent thermal transients.

The new TBC coating 20 disclosed here is a pyrochlore crystal structure having a chemical formula consisting essentially of $A^{n+}_{2-x}B^{m+}_{2+x}O_{7-y}$, where A is selected from the group of elements consisting of La, Ce, Pr, Nd, Sm, Eu, Gd, Tb, Dy, Ho, Er, Tm, Yb, and mixtures thereof; where B is selected from the group of elements consisting of Zr, Hf, Ti and mixtures thereof; n and m are the valence of A and B respectively; and, for $-0.5 \leq x \leq 0.5$, $$y = 7 - \frac{[(2-x)n + (2+x)m]}{2},$$

and excluding the following combinations for x=0, y=0: A=La and B=Zr; A=La and B=Hf; A=Gd and B=Hf; and A=Yb and B=Ti.

In the above formula, the values "n" and "m" in the brackets are the charge of the A and B elements; for example, if $A=Sm^{3+}$ and $B=Zr^{4+}$, n=3 and m=4, then the value of y is:

$$y = 7 - \frac{[(2-x)3 + (2+x)4]}{2},$$

The above ranges of x and y clearly indicate that a defective pyrochlore structure is also a candidate for a TBC. For example, for A=Sm, B=Zr and x=0, y is equivalent to 0 and the formula reduces to $Sm_2Zr_2O_7$, a preferred embodiment. For x=0.1, y is equivalent to −0.05 and the formula is $Sm_{1.9}Zr_{2.1}O_{7.05}$, also a preferred embodiment. A listing of other preferred materials $-0.5 \leq x \leq 0.5$ and $$y = 7 - \frac{[(2-x)n + (2+x)m]}{2}:$$

A=Eu and B=Zr; and A=Gd and B=Zr.

Figure 3:
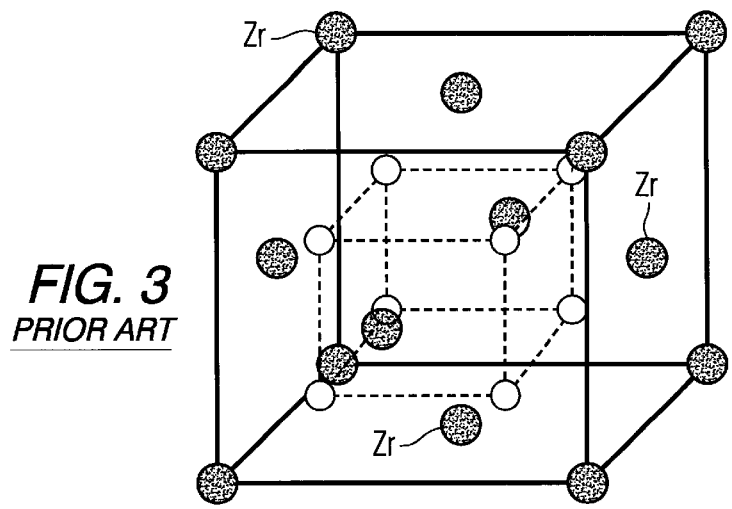
FIG. 3 shows a fluorite crystal structure for prior art YSZ (yttria-stabilized zirconia) thermal barrier layers.

These materials are stable upon long-term exposure at high temperatures. Due to their phase stability and high sintering resistance, they are potential candidates for thermal barrier coating applications. As mentioned previously, conventional TBC coatings are yttria-stabilized zirconia (YSZ), preferably 8 wt. % YSZ (8YSZ). YSZ can be described by the unit cell of $ZrO_2$ shown in FIG. 3. The $ZrO_2$ crystal structure is depicted by the arrangement of the cations Zr and the anions O, as shown. It consists of a face-centered arrangement of Zr ions, shown as black circles. The anions are in the tetrahedral sites within the cube. There are eight oxygen atoms, shown as white circles for clarity, and 4 Zr atoms, resulting in $ZrO_2$. Yttrium ions are not shown for clarity. A key feature of YSZ is that yttrium ions are randomly distributed in the Zr sites, resulting in oxygen vacancies in the $ZrO_2$ lattice structure. These vacancies are also randomly distributed, and are not shown in the figure. This is a well known crystal structure.

Materials with a pyrochlore structure are discussed in detail by M. A. Subramanian, et al., in "Oxide Pyrochlores—A Review," Prog. Solid State Chem., vol. 15, pp. 55,143, (1983). There, on page 65, a pyrochlore structure derived from a fluorite lattice was shown. While this paper discusses the crystal structure, no reference is made to TBC applications.

The pyrochlore structure can be described as a structure with ordered oxygen vacancies (as distinguished from the random oxygen vacancies of YSZ) located in a crystal structure. The pyrochlore structure can, in principle, be shown to be a derivative of the $ZrO_2$ crystal structure. Since the pyrochlore structure is a derivative of the $ZrO_2$ structure, several of the same advantageous properties—such as low thermal conductivity, high thermal expansion, and deposition of single crystalline columns—are expected.

Figure 4A:
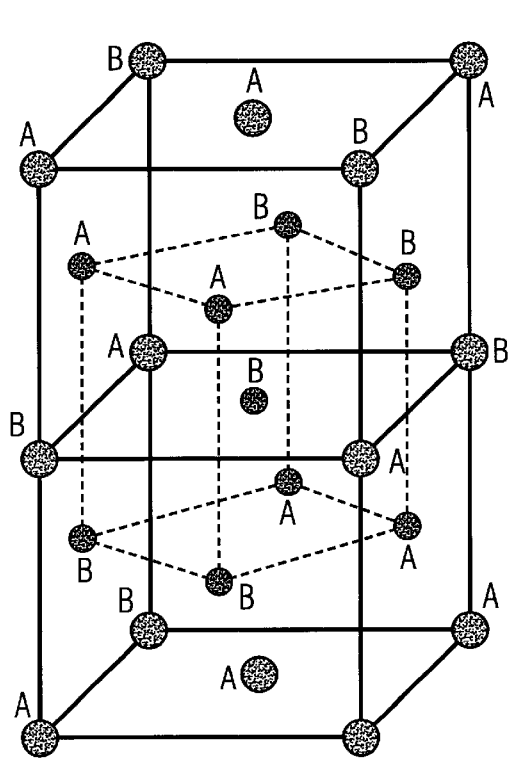
FIGS. 4(a) and 4(b) show the pyrochlore crystal structures of this invention including their oxygen vacancies.
Figure 4B:
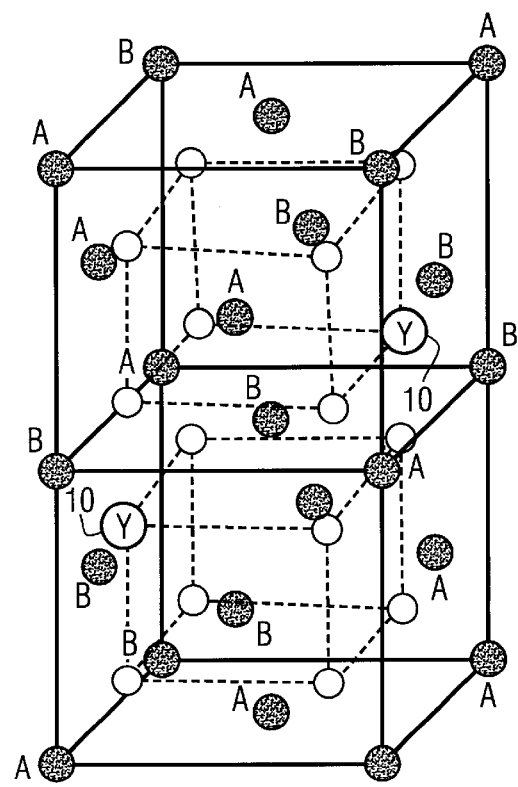

This paragraph will now describe, in a simple manner, the relationship of the pyrochlore structure to the fluorite, $ZrO_2$ structure. Doubling the $Zr_4O_8$ unit cell results in a "$Zr_8O_{16}$" unit cell, where the Zr sites are now occupied by equal amounts of A and B cations to form $A_4B_4O_{16}$. The A and B cations are arranged in an ordered manner; the relationship of the arrangement of these cations to that of the $ZrO_2$ crystal structure is shown in FIGS. 4(a) and 4(b). FIG. 4(a) shows the structure, without oxygen present, consisting of two $ZrO_2$ unit cells, one on top of the other, $A_4B_4O_{16}$ (shown for the sake of clarity to identify A and B anions). FIG. 4(b) shows the entire pyrochlore structure, with oxygen atoms shown as white circles and oxygen vacancies shown as circles with a Y inside them and labeled 10. The pyrochlore structure of FIG. 4(b) consists of missing oxygen atoms (of which there are two) in specific locations. Therefore, this results in a formula of $A_4B_4O_{14}$—or, actually, $A_2B_2O_7$—a common formula for a pyrochlore structure. This crystal structure could be maintained with more oxygen vacancies/excess, in combination with A and B cation excess/vacancies. These defects can be represented by $A_{2-x}B_{2+x}O_{7-y}$, where x can range from 0.5 to −0.5 and y depends on x as follows:

$$y = 7 - \frac{[(2-x)n + (2+x)m]}{2}$$

where $A^{n+}$ and $B^{m+}$ are the ions in the formula $A_{2-x}B_{2+x}O_{7-y}$. This non-stoichiometry can result in significant increases in sintering resistance. The preferred materials result when A is Sm and B is Zr.

The main advantages of the pyrochlore structure over the fluorite structure are: (1) the atomic oxygen defects are key for a low thermal conductivity, since the defects result in phonon scattering during thermal conduction; (2) the presence of defects also results in a higher thermal expansion, a feature important for reducing thermal expansion mismatch between the substrate and the ceramic coating; (3) the similarity of the pyrochlore crystal structure to the fluorite crystal structure is also key for the growth of single crystal columns during EB-PVD growth (as the growth of single crystal columns is directly related to the crystal structure); (4) the crystal structure could also be important for the formation of the vertical columns due to solidification within the splat in APS coatings; (5) the pyrochlore structure is a stable crystal structure without crystallographic transformations with changes in temperature; and (6) sintering resistance of the pyrochlores could also be higher than that of YSZ (in YSZ, the oxygen defects are very mobile and can contribute to sintering, whereas in the pyrochlore structure, the oxygen defects are ordered and, hence, can be more resistant to sintering).

These TBC coatings can be applied by APS and/or EB-PVD. This ceramic TBC coating can be applied as a top coat to an MCrAlY or other bond coat, diffusion coating; or directly to the substrate material; or to a standard base TBC as a top TBC coating. These ceramic thermal barrier coatings can be used on rotating components, such as blades, and stationary components, such as vanes, in gas turbine engines to maintain the underlying metallic components below a critical temperature. Utilization of this thermal barrier coating will also reduce the cooling air requirements and subsequently increase the engine efficiency. These materials are complete replacements for YSZ TBCs and, in columnar form, need not be coated with any other material to maintain their resistance to sintering.

The following example is presented to help illustrate the invention, and should not be considered in any way limiting.

EXAMPLE

Figure 5:
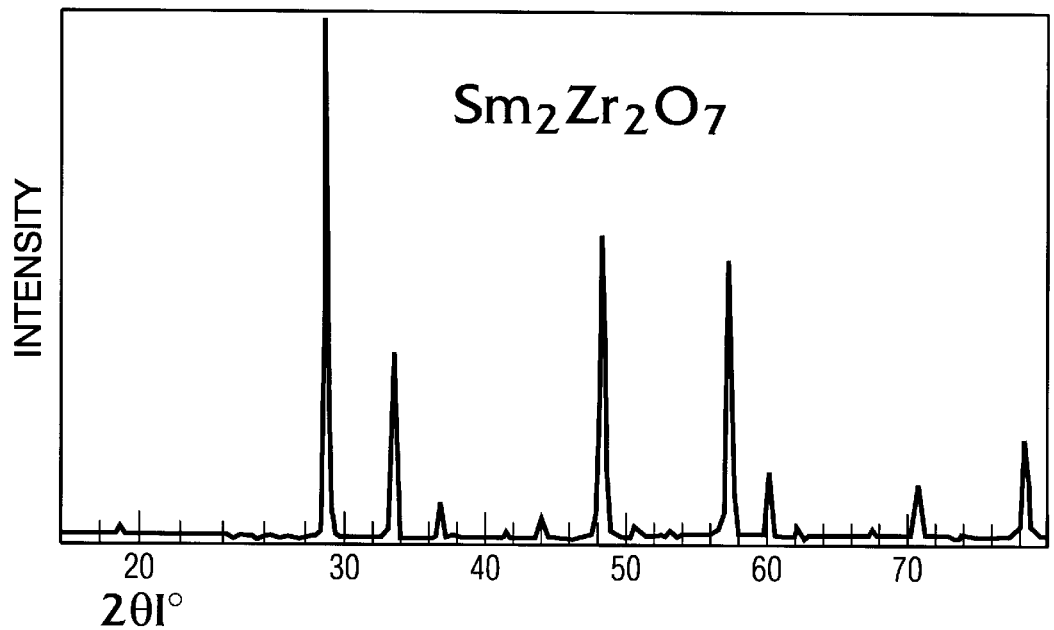
FIG. 5 shows x-ray diffraction data showing a pyrochlore structure of a deposited $Sm_2Zr_2O_7$ TBC coating.
Figure 6:
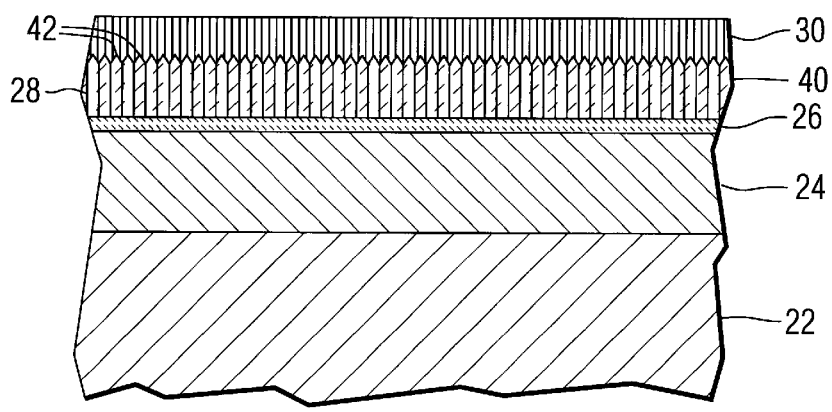
FIG. 6 shows an idealized fragmented sectional view through a turbine component showing a $Sm_2Zr_2O_7$ TBC deposited on a layer of yttria-stabilized zirconia.

A sample of $Sm_2Zr_2O_7$ powder ($Sm_2O_3 + 2ZrO_2$) was made and analyzed to insure that the sample had a pyrochlore structure. A graph of the x-ray diffraction data for the sample is shown in FIG. 5. A first layer of fluorite crystal, 8 wt. % yttria-stabilized zirconia (8YSZ), was deposited, shown as 40 in FIG. 6, on top of a superalloy substrate 22 having a MCrAlY basecoat 24 and oxide scale 26. The 8YSZ had a well known columnar structure and was deposited by well known electron beam physical vapor deposition (EB-PVD) techniques and was about 225 micrometers thick. Using the top 42 of the 8YSZ to provide nucleation sites, a top TBC columnar layer 30 of $Sm_2Zr_2O_7$, about 225 micrometers thick, was also deposited by well known EB-PVD technologies. This provided a dual TBC system. X-ray diffraction data confirmed that the coating had a pyrochlore crystal structure, with a result similar to that shown in FIG. 5. The TBC layers both provided a columnar TBC with minute microcracks or gaps between the columns.

With a limited amount of material and a goal of thermal stability at 1400° C., the sample was placed in an oven at 1400° C. for 500 hours. The $Sm_2Zr_2O_7$ layer resisted substantial sintering and there was no loss of inter-columnar spaces.

The successful $Sm_2Zr_2O_7$ sample contained about 33 mole % $Sm_2O_3$. It is expected that a range described by the values of x and y are all preferred within the pyrochlore structure. As a comparative sample, powder compacts of 8YSZ were compared to powder compacts of $La_2Zr_2O_7$ after sinter aging the powder compacts at 1400° C. for 1 and 10 days. Photomicrographs showed that, after 10 days, 8YSZ still had a significant amount of porosity, however $La_2Zr_2O_7$ had almost no porosity remaining. This suggests that the specific $La_2Zr_2O_7$ compound cannot withstand high temperatures and is very likely to lose its strain tolerance. It should be noted that stoichiometric $La_2Zr_2O_7$ was utilized in this comparison. If cation excess/vacancies or oxygen excess/vacancies were introduced, they could significantly change the sintering properties.

The present invention may be embodied in other forms without departing from the spirit or essential attributes thereof, and accordingly, reference should be made to both the appended claims and the foregoing specification as indicating the scope of the invention.

What is claimed is:

1. A device operating over a range of temperatures and having a deposited thermal barrier coating on at least a portion of its surface, the device comprising:
   a substrate with a base coat; and then
   a deposited ceramic thermal barrier layer, said ceramic thermal barrier layer consisting essentially of a pyrochlore crystal structure having a chemical formula consisting essentially of $A^{n+}_{2-x}B^{m+}_{2+x}O_{7-y}$ where A is selected from the group of elements consisting of La, Ce, Pr, Nd, Sm, Eu, Gd, Tb, Dy, Ho, Er, Tm, Yb, and mixtures thereof; where B is selected from the group of elements consisting of Zr, Hf, Ti and mixtures thereof; n and m are the valence of A and B respectively; and for $-0.5 \leq x \leq 0.5$, $$y = 7 - \frac{((2-x)n + (2+x)m)}{2},$$

and excluding the following combinations for x=0, y=0: A=La and B=Zr; A=La and B=Hf; A=Gd and B=Hf; and A=Yb and B=Ti.

2. The device of claim 1, wherein the microstructure of the thermal barrier layer is characterized by a plurality of gaps extending through the thickness.

3. The device of claim 1, wherein said ceramic thermal barrier is stable over a range of temperatures up to about 1500° C.

4. The device of claim 1, wherein said ceramic thermal barrier coating consists essentially of $Sm_{2-x}Zr_{2+x}O_{7-y}$ where $-0.5 \leq X \leq 0.5$ and $$y = 7 - \frac{[(2-x)3 + (2+x)4]}{2}.$$

5. The device of claim 1, wherein said ceramic thermal barrier is resistant to sintering.

6. The device of claim 1, wherein said ceramic thermal barrier is resistant to sintering and contains gaps within its structure generally parallel to the substrate surface.

7. The device of claim 1, wherein said ceramic thermal barrier consists of a material selected from the group consisting essentially of A=Sm and B=Zr; A=Eu and B=Zr; and A=Gd and B=Zr.

8. The device of claim 1, wherein said ceramic thermal barrier consists essentially of $Sm_2Zr_2O_7$.

9. The device of claim 1, wherein said substrate is a turbine component.

10. The device of claim 1 wherein said substrate is selected from turbine blades, turbine vanes and turbine transitions.

11. The device of claim 1 also containing a MCrAlY alloy base coat layer between the substrate and the ceramic thermal barrier layer, wherein M is selected from the group consisting of Ni, Co, Fe, and mixtures, and where the substrate is selected from the group consisting of metallic superalloy materials and ceramic materials.

12. The device of claim 1, operating in a turbine at temperatures up to 1500° C.

13. A method for producing a device operable over a range of temperatures, the method comprising the steps of:

providing a substrate; and depositing a ceramic thermal barrier layer over the substrate in a manner that provides a deposited ceramic layer consisting essentially of a pyrochlore crystal structure having a chemical formula consisting essentially of $A^{n+}_{2-x}B^{m+}_{2+x}O_{7-y}$, where A is selected from the group of elements consisting of La, Ce, Pr, Nd, Sm, Eu, Gd, Tb, Dy, Ho, Er, Tm, Yb, and mixtures thereof; where B is selected from the group of elements consisting of Zr, Hf, Ti and mixtures thereof; n and m are the valence of A and B respectively; and for $-0.5 \leq x \leq 0.5$, $$y = 7 - \frac{((2-x)n + (2+x)m)}{2},$$

and excluding the following combinations for x=0, y=0: A=La and B=Zr; A=La and B=Hf; A=Gd and B=Hf; and A=Yb and B=Ti.

14. The method of claim 13, where the microstructure of the thermal barrier layer is characterized by a plurality of gaps of the thermal barrier layer is extending through the thickness.

15. The method of claim 13, wherein the step of depositing further comprises the step of depositing a MCrAlY alloy base coat layer on the substrate before depositing the ceramic thermal barrier layer, wherein M is selected from the group consisting of Ni, Co, Fe, and mixtures.

16. The method of claim 13, wherein the step of depositing the thermal barrier coating is selected from plasma spray techniques, electron beam physical vapor deposition, D-gun techniques, high velocity oxygen fuel deposition techniques, inductively coupled deposition processes, and electron beam directed vapor deposition techniques.

17. The method of claim 13, wherein said ceramic thermal barrier coating consists essentially of $Sm_{2-x}Zr_{2+x}O_{7-y}$ where $-0.5 \leq X \leq 0.5$ and $$y = 7 - \frac{[(2-x)3 + (2+x)4]}{2}.$$

18. The method of claim 13, wherein said ceramic thermal barrier consists essentially of $Sm_2Zr_2O_7$ deposited as an admixture of $Sm_2O_3$ plus $ZrO_2$ where the mole % of $Sm_2O_3$ ranges from about 15 mole % to about 40 mole %.

* * * * *